United States Patent [19]

Romian

[11] 3,945,082

[45] Mar. 23, 1976

[54] SAUSAGE STUFFING MACHINE

[76] Inventor: Edward Romian, Box 74, Oak Leaf Estates, R.D. No. 2, West Middlesex, Pa. 16159

[22] Filed: Nov. 1, 1974

[21] Appl. No.: 519,864

[52] U.S. Cl. .......................................... 17/33; 17/39
[51] Int. Cl.² ............................................ A22C 11/00
[58] Field of Search ............... 17/33, 35, 36, 38, 39

[56] References Cited
UNITED STATES PATENTS

| | | | |
|---|---|---|---|
| 1,054,633 | 2/1913 | Balker | 17/39 |
| 2,608,715 | 9/1952 | Fernandez | 17/39 |
| 2,794,210 | 6/1957 | Opiekon | 17/39 |

*Primary Examiner*—Louis G. Mancene
*Assistant Examiner*—Robert F. Cutting
*Attorney, Agent, or Firm*—Webster B. Harpman

[57] ABSTRACT

A sausage stuffing machine positions a portable, cylindrical sausage meat container on a base which supports a pneumatic piston and cylinder assembly in elevated relation above said container, the piston rod of the piston and cylinder assembly having a secondary piston thereon arranged for registry with said container so that sausage meat therein can be forced therefrom through an extrusion tube in the bottom thereof.

4 Claims, 4 Drawing Figures

U.S. Patent   March 23, 1976   3,945,082
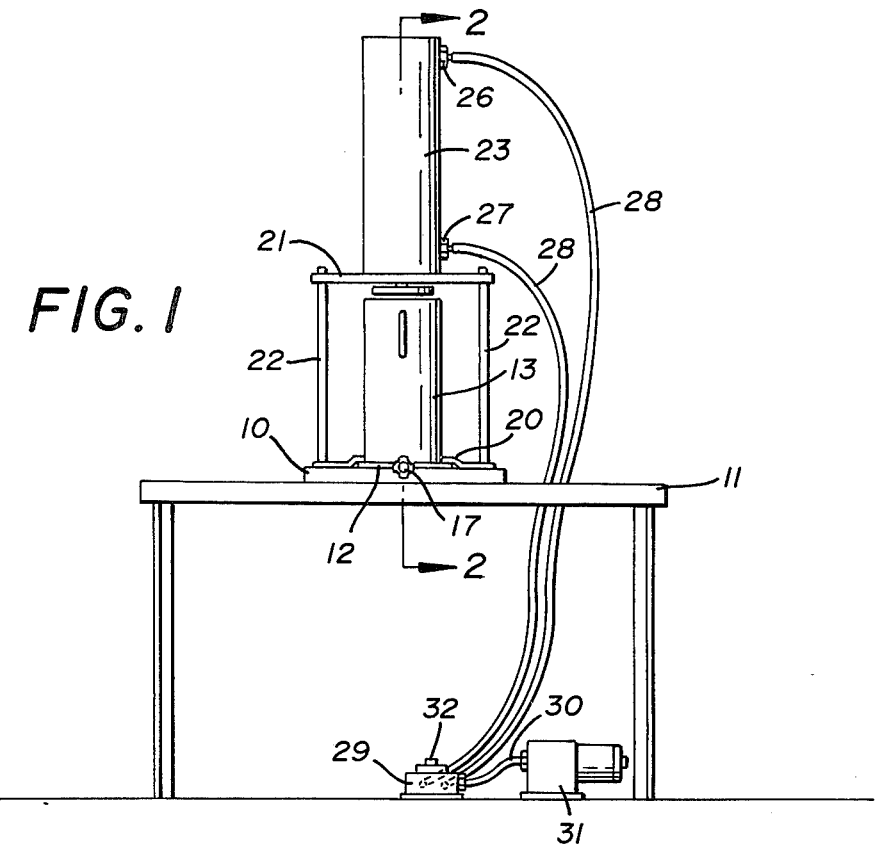
FIG. 1
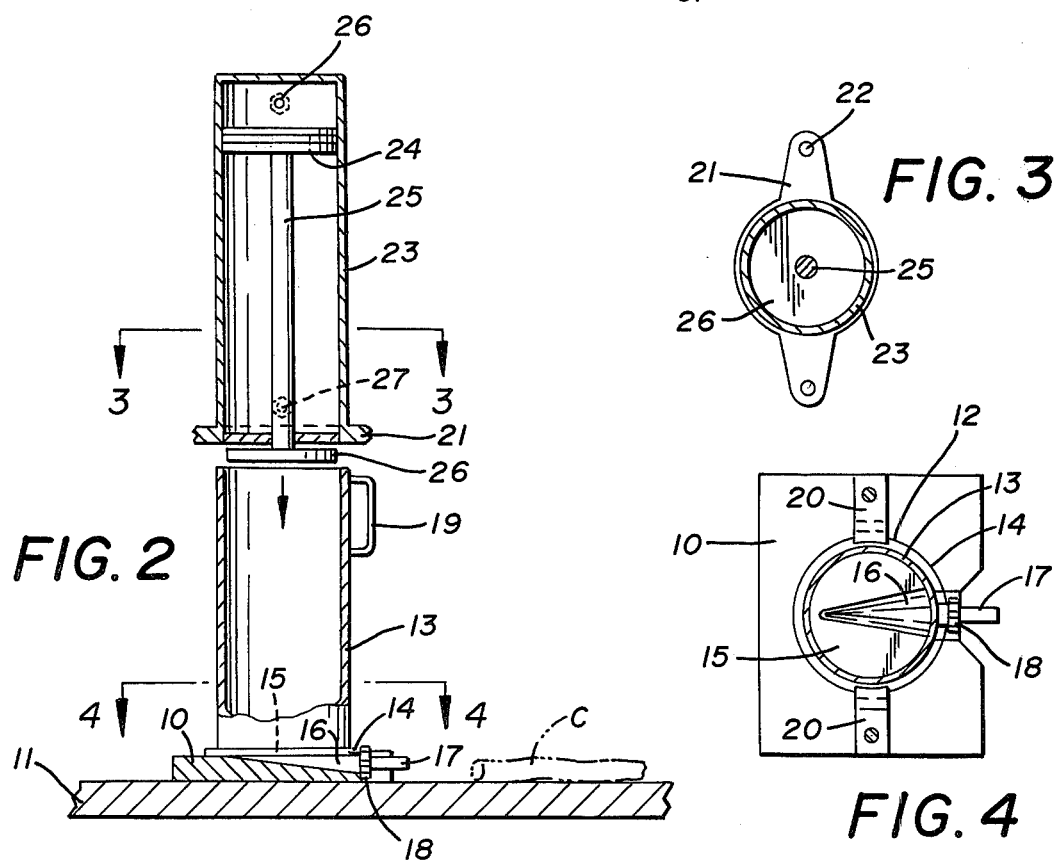
FIG. 2
FIG. 3
FIG. 4

3,945,082

SAUSAGE STUFFING MACHINE

BACKGROUND OF THE INVENTION

1. Field of the Invention:

This invention relates to sausage stuffing machines and the like wherein prepared sausage or other meat products are forcefully positioned in tubular casings.

2. Description of the Prior Art:

Prior structures of this type may be seen in U.S. Pat. Nos. 343,077 in which a meat container is suspended from a table with a piston and cylinder assembly thereabove, 400,323 wherein a meat container is slidably mounted on a support for movement into and away from registry with a piston and cylinder assembly.

Still other patents showing prior art devices are U.S. Pat. Nos. 2,608,715, 3,163,542 and 3,670,362.

This invention eliminates some of the problems found in the prior art devices and in particular the difficulty of bringing the meat product to the machine as the present device permits complete portability of the sausage meat container and freedom of movement of the same with respect to the machine.

SUMMARY OF THE INVENTION

A sausage stuffing machine comprises a base having configurations for registry with a sausage meat container and devices for holding the same in registry with a pneumatic piston and cylinder assembly positioned thereabove and supported thereby, the piston rod of the piston and cylinder assembly having a secondary piston arranged for registry with the sausage meat container and the container has an extrusion tube communicating with the bottom thereof and extending outwardly therefrom for receiving a tubular casing into which the sausage stuffing machine will extrude the sausage when actuated.

DESCRIPTION OF THE DRAWINGS

FIG. 1 is a front elevation of the sausage stuffing machine and actuating means therefor, FIG. 2 is an enlarged cross sectional elevation on line 2—2 of FIG. 1, FIG. 3 is a horizontal section on line 3—3 of FIG. 2, and FIG. 4 is a horizontal section on line 4—4 of FIG. 2.

DESCRIPTION OF THE PREFERRED EMBODIMENT

In its simplest form the sausage stuffing machine comprises a base 10 which is illustrated in FIGS. 1 and 2 of the drawings as being supported on a table 11, the base 10 having a central area 12 arranged for the reception and retention of a portable cylindrical sausage meat container 13 which is provided with an annular flange 14 on its lowermost end. A bottom 15 is formed in the container 13 and has a hollow downwardly and sidewardly extending portion 16 which extends outwardly and sidewardly therefrom and terminates in an extrusion tube 17. A clamping device 18 positioned on the extrusion tube 17 may be used to temporarily secure a casing thereto such as shown in broken lines in FIG. 2 of the drawings and indicated by the letter C.

The container 13 is provided with a handle 19 so that it may be conveniently moved into position in the sausage stuffing machine as shown in FIGS. 1, 2 and 4 of the drawings or removed therefrom. The base 10 is provided with oppositely disposed clamping arms 20, the inner opposed ends of which are arranged to overlie the upper surface of the annular flange 14 on the bottom of the portable cylindrical sausage meat container 13 and position it in a desired location thereon.

By referring now to FIGS. 1, 3 and 4 of the drawings it will be seen that a secondary base 21 is positioned in elevated relation to the base 10 by a pair of rods 22 arranged to hold the secondary base 21 in fixed relation to the base 10. A pneumatic cylinder 23 is mounted on the secondary base 21 in upstanding relation relative thereto and operatively receives a piston 24 having a piston rod 25 extending downwardly therefrom and out of a gland in the bottom of the cylinder 23 and terminating in a secondary piston 26. The secondary piston 26 is of a size and shape for close registry within the portable cylindrical sausage meat container 13 so that when it is moved downwardly by the piston rod 25 and piston 24 due to the presence of compressed air in the cylinder 23, sausage meat in the container 13 will be moved downwardly therein and outwardly through the extrusion tube 17 and into the casing C heretofore described. Double ports 26 and 27 are formed in spaced relation in the pneumatic cylinder 23 and air tubing or piping 28 communicates therewith and with a two-way valve 29 which communicates by way of a tube 30 with a source of air pressure 31. The two-way valve 29 is arranged for manual actuation, for example depressing an exterior lever 32 thereon directs air into the upper end of the cylinder 23 to move the secondary piston 26 downwardly into the portable cylindrical sausage meat container 13 and release of the lever 32 directs air into the lower portion of the cylinder 23 and moves the secondary piston 26 upwardly and out of the container 13.

It will thus be seen that the sausage stuffing machine disclosed herein provides a simple and efficient device for the purpose and permits complete portability of the portion of the device in which the sausage meat or other product is positioned for stuffing a casing or the like. The arrangement of the base 10 of the device for desired registry of the sausage meat container thereon insures registry of the secondary piston 26 therewith and it will occur to those skilled in the art that a number of sausage meat containers can be used interchangeably with the device of the invention.

Although but one embodiment of the present invention has been illustrated and described it will be apparent to those skilled in the art that various changes and modifications may be made therein without departing from the spirit of the invention and having thus described my invention what I claim is:

1. In a sausage stuffing machine having an elevated vertically positioned pneumatic piston and cylinder assembly and means for supplying air pressure for actuating the same and a secondary piston connected to said first mentioned piston and movable thereby; a portable container for sausage meat, said portable container having an open upper end and a flange on its lower end and means for locating and detachably holding said container in a position in said machine below said secondary piston for registry therewith, said means including a base supporting said portable container and supporting said elevated piston and cylinder assembly in spaced relation thereabove so that actuation of said piston and cylinder assembly moves said secondary piston into and out of said portable container when the same is in said machine, clamping arms on said base arranged to engage said flange on said portable container, said portable container having a bottom with an opening therein and an extrusion tube communicating with said opening and extending outwardly from said container.

2. The sausage stuffing machine set forth in claim 1 and wherein said base and the bottom of said portable container have registering configurations arranged to guide and position said portable container on said base in alignment with said secondary piston.

3. The sausage stuffing machine set forth in claim 1 and wherein said portable sausage meat container is cylindrical and said secondary piston is circular and said flange is annular.

4. The sausage stuffing machine set forth in claim 2 and wherein said registering configurations comprise said extrusion tube positioned on the bottom of said portable container and a cutaway area in said base for registry with said extrusion tube, said cutaway area being tapered inwardly and upwardly with respect to an edge of said base.

* * * * *